US012375710B2

(12) United States Patent
Zhao et al.

(10) Patent No.: US 12,375,710 B2
(45) Date of Patent: Jul. 29, 2025

(54) ADAPTIVE MOTION VECTOR FOR WARPED MOTION MODE OF VIDEO CODING

(71) Applicant: Tencent America LLC, Palo Alto, CA (US)

(72) Inventors: Liang Zhao, Palo Alto, CA (US); Han Gao, Palo Alto, CA (US); Xin Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 279 days.

(21) Appl. No.: 18/195,888

(22) Filed: May 10, 2023

(65) Prior Publication Data

US 2024/0031596 A1 Jan. 25, 2024

Related U.S. Application Data

(60) Provisional application No. 63/390,551, filed on Jul. 19, 2022.

(51) Int. Cl.
*H04N 19/00* (2014.01)
*H04N 19/159* (2014.01)
(Continued)

(52) U.S. Cl.
CPC ........... *H04N 19/52* (2014.11); *H04N 19/159* (2014.11); *H04N 19/176* (2014.11); *H04N 19/70* (2014.11)

(58) Field of Classification Search
CPC .................................................. H04N 19/00
See application file for complete search history.

(56) References Cited

U.S. PATENT DOCUMENTS

2018/0091816 A1 3/2018 Chien et al.
2018/0278951 A1 9/2018 Seregin et al.
(Continued)

FOREIGN PATENT DOCUMENTS

WO WO 2019244052 A1 12/2016

OTHER PUBLICATIONS

Benjamin Bross et al., "Versatile Video Coding Editorial Refinements on Draft 10", Document: JVET-T2001-v2, Joint Video Experts Team (JVET) of ITU-T SG 16 WP 3 and ISO/IEC JTC 1/SC 29, 20th Meeting, by teleconference, Oct. 7-16, 2020, 541 pgs.
(Continued)

*Primary Examiner* — Maryam A Nasri
(74) *Attorney, Agent, or Firm* — Morgan, Lewis & Bockius LLP

(57) ABSTRACT

The various implementations described herein include methods and systems for coding video. In one aspect, a method includes receiving a video bitstream including a current coding block in a current image frame, obtaining a syntax element value, and determining whether the current coding block is coded with a warped motion mode or a translational motion mode based on the syntax element value. The method further includes in accordance with a determination that the current coding block is coded with the warped motion mode, selecting a first motion vector difference (MVD) setting for the current coding block; in accordance with a determination that the current coding block is coded with the translational motion mode, selecting a second MVD setting distinct from the second MVD setting for the current coding block; and reconstructing the current coding block based at least in part on the selected MVD setting for the current coding block.

20 Claims, 8 Drawing Sheets

(51) Int. Cl.
*H04N 19/176* (2014.01)
*H04N 19/52* (2014.01)
*H04N 19/70* (2014.01)

(56) References Cited

U.S. PATENT DOCUMENTS

| | | |
|---|---|---|
| 2020/0036956 A1 | 1/2020 | Schwarz et al. |
| 2020/0260119 A1 | 8/2020 | Esenlik et al. |
| 2021/0203947 A1* | 7/2021 | He .................. H04N 19/523 |
| 2022/0078488 A1 | 3/2022 | Leleannec et al. |
| 2025/0039436 A1* | 1/2025 | Lu .................. H04N 19/521 |

OTHER PUBLICATIONS

Elliott Karpilovsky et al., "Proposal: New Inter Modes for AV2", Document: CWG-8018 v1, Alliance for Open Media, Codec Working Group, Feb. 24, 2021, 6 pgs.

Leo Zhao et al., "Advanced Motion Vector Difference Coding", Document: CWG-B092, Alliance for Open Media, Codec Working Group, Nov. 24, 2021, 7 pgs.

Leo Zhao et al., "Improved Adaptive MVD Resolution", Document: CWG-C011, Alliance for Open Media, Codec Working Group, Feb. 9, 2022, 7 pgs.

Lester (Keng-Shih) Lu et al., "Optical Flow Motion Vector Refinement for AV2", Document: CWG-B041_v3, Alliance for Open Media Codec Working Group, Google, Sep. 20, 2021, 11 pgs.

Peter de Rivaz et al., "AV1 Bitstream & Decoding Process Specification", The Alliance for Open Media, Jan. 8, 2019, 681 pgs.

Xin Zhao et al., "Tool Description for AV1 and Libaom", Document: CWG-B078_v1, Alliance for Open Media Codec Working Group, Oct. 4, 2021, 41 pgs.

Yue Chen et al., "An Overview of Core Coding Tools in the AV1 Video Codec", 2018 IEEE, 5 pgs.

Tencent Technology, ISRWO, PCT/US2023/021945, Aug. 4, 2023, 13 pgs.

* cited by examiner

ADAPTIVE MOTION VECTOR FOR WARPED MOTION MODE OF VIDEO CODING

CROSS-REFERENCE TO RELATED APPLICATION

This application claims priority to U.S. Provisional Patent Application No. 63/390,551, entitled "ADAPTIVE MOTION VECTOR FOR WARPED MOTION MODE OF VIDEO CODING," filed Jul. 19, 2022, which is hereby incorporated by reference in its entirety.

TECHNICAL FIELD

The disclosed embodiments relate generally to video coding, including but not limited to systems and methods for dynamically adjusting motion vector difference settings (e.g., precision limit, magnitude range) for different motion compensation modes in inter prediction of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes dynamically adjusting motion vector difference (MVD) settings (e.g., precision limit, magnitude range) for different motion compensation modes in inter prediction of video data. For example, the motion compensation modes include a warped motion mode and a translational motion mode. In the translational motion mode, a current coding block of a current frame is associated with a reference block of a reference frame via translational motion. In the warped motion mode, the current coding block of the current frame is associated with the reference block of the reference frame via warped motion, e.g., including translational, scaling, and/or rotational motions. Adaptive MVD precision is applied to both translational motion and warped motion. In some embodiments, allowed MVD magnitudes are the same for these two modes, while it is suboptimal to share the same sets of MVD magnitudes between these two modes in view of different characteristics of warped motion and translational motion. In various embodiments of this application, MVD settings (e.g., precision limit, magnitude range) are customized and optimized for the warped motion mode and the translational motion mode in inter prediction of video data.

In accordance with some embodiments, a method of video coding is provided. The method includes receiving a video bitstream including a current coding block in a current image frame and obtaining a syntax element value associated with the current coding block in the current image frame. The syntax element value is signaled before a motion vector difference (MVD) associated with the current coding block. The syntax element value indicates whether the current coding block is coded in a warped motion mode. The method further includes determining whether the current coding block is coded with a warped motion mode or a translational motion mode based on the syntax element value. The method further includes in accordance with a determination that the current coding block is coded with the warped motion mode, selecting a first MVD setting for the current coding block. The method further includes in accordance with a determination that the current coding block is coded with the translational motion mode, selecting a second MVD setting for the current coding block. The second MVD setting is distinct from the second MVD setting. The method further includes reconstructing the current coding block based at least in part on the selected MVD setting for the current coding block.

In some embodiments, the first MVD setting includes a first MVD precision limit, and the second MVD setting includes a second MVD precision limit. The first MVD precision limit is lower than the second MVD precision limit. In some embodiments, the first MVD setting further includes a first MVD magnitude range, and the second MVD setting includes a second MVD magnitude range. The first MVD magnitude range is distinct from the second MVD magnitude range.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes dynamically adjusting motion vector difference (MVD) settings (e.g., precision limit, magnitude range) for different motion compensation modes in inter prediction of video data. For example, the motion compensation modes include a warped motion mode and a translational motion mode. In the translational motion mode, a current coding block of a current frame is associated with a reference block of a reference frame via translational motion. In the warped motion mode, the current coding block of the current frame is associated with the reference block of the reference frame via warped motion, e.g., including translational, scaling, and/or rotational motions. Adaptive MVD precision is applied to both translational motion and warped motion, and MVD settings (e.g., precision limit, magnitude range) are customized for the warped motion mode and the translational motion mode in inter prediction of video data. By these means, MVD precisions, precision limits, magnitudes, and/or magnitude ranges can be optimized for the warped motion mode and the translational motion mode separately.

Figure 1:
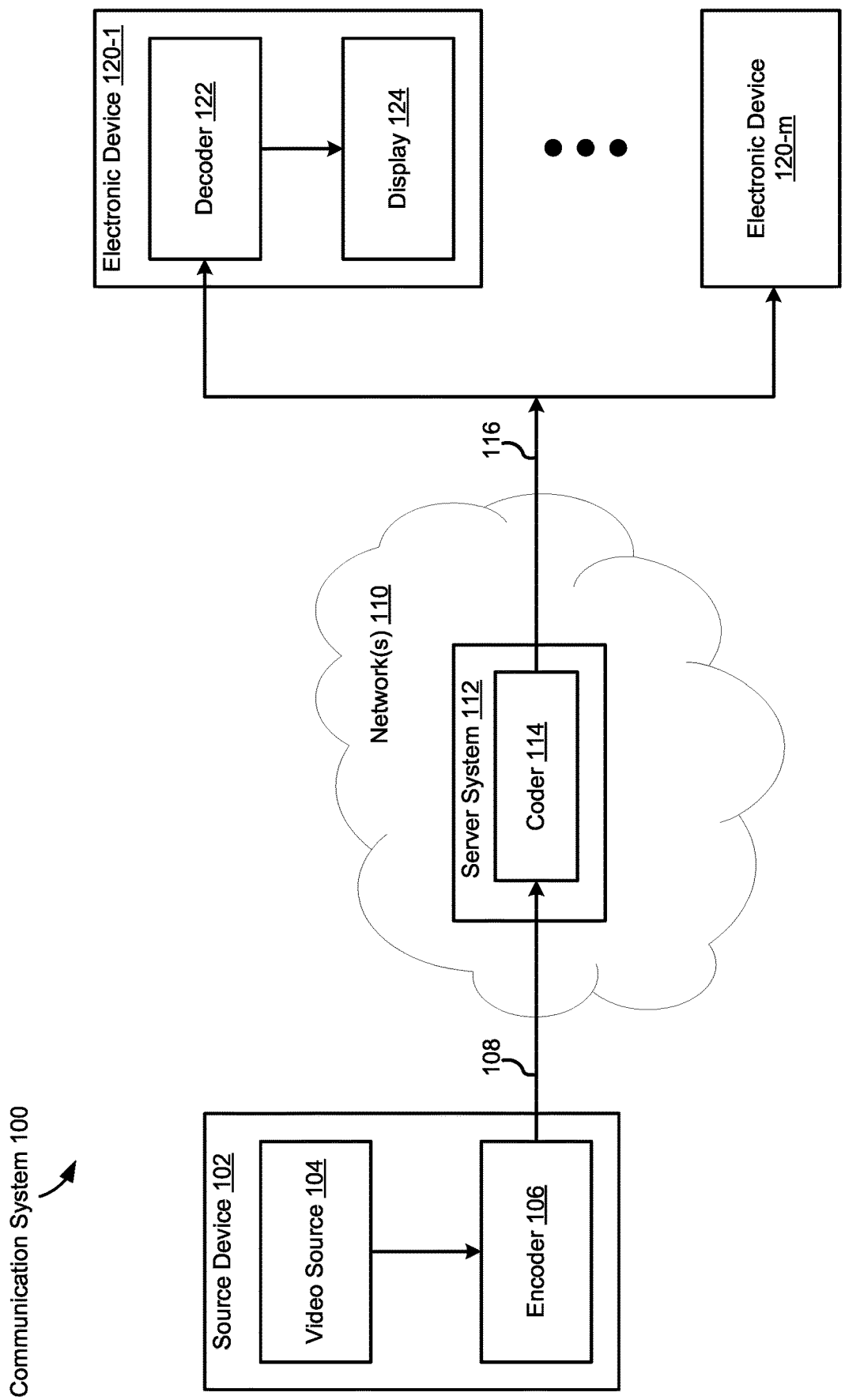
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
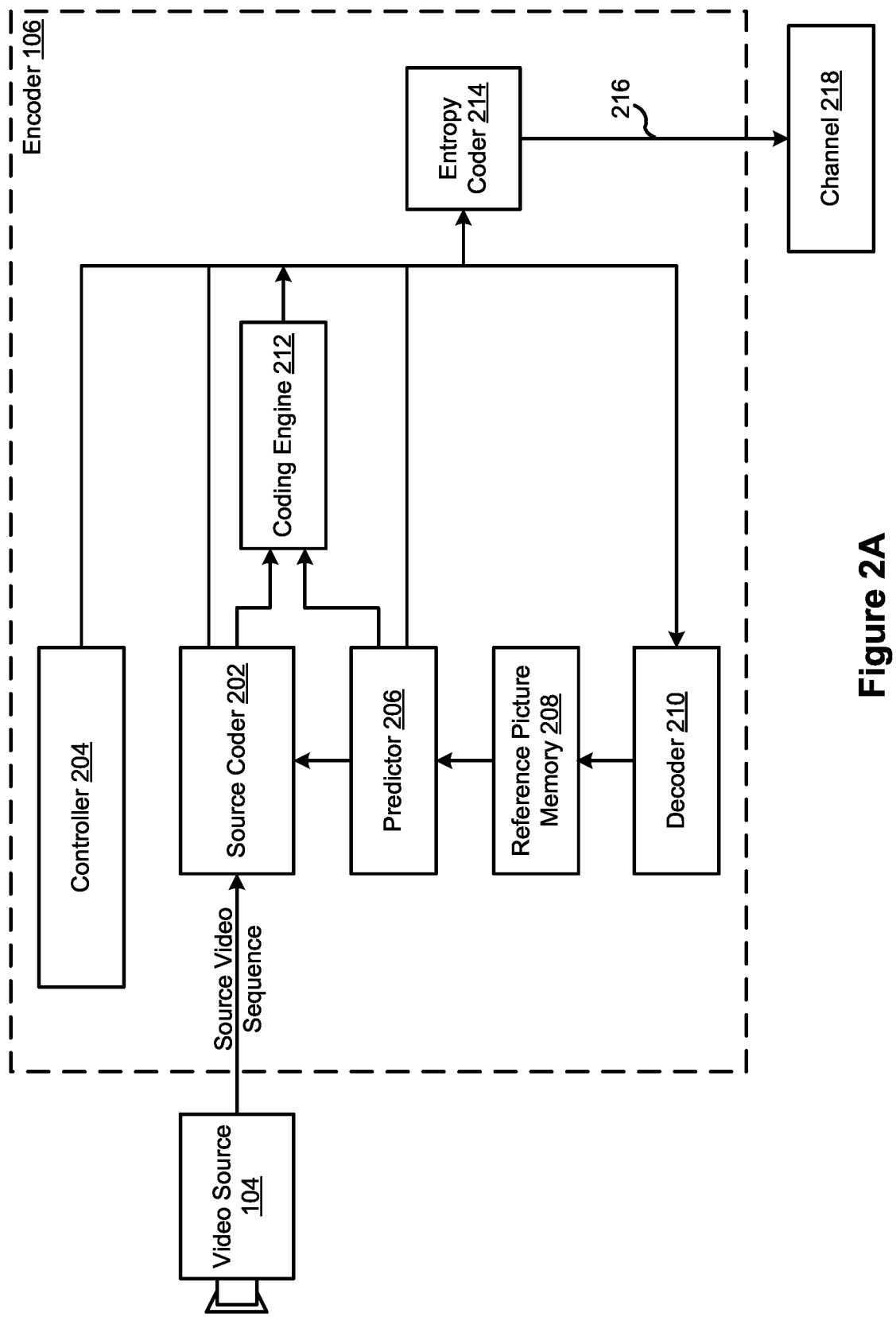
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color space (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
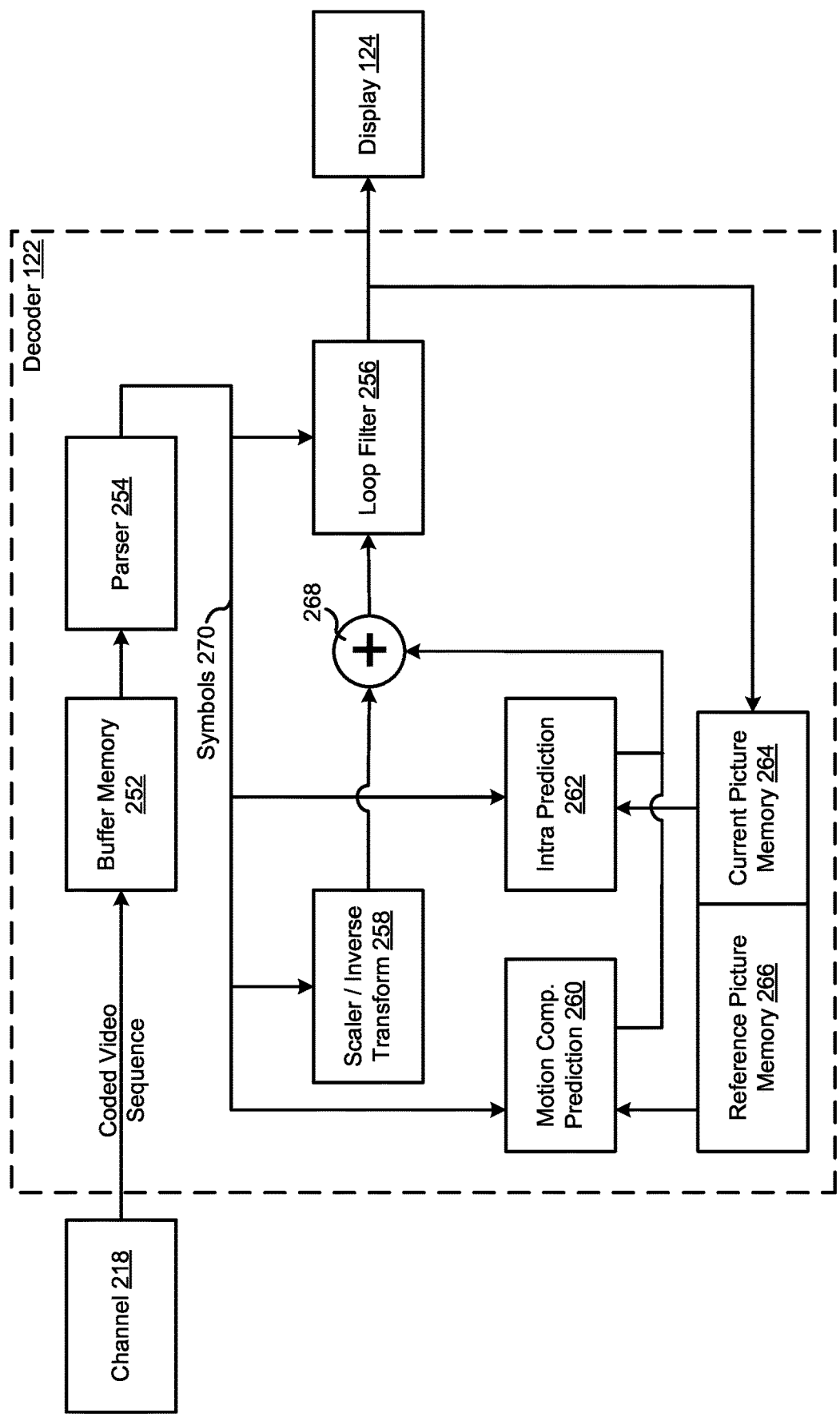
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (JIRD) specifications and metadata for HRD buffer management signaled in the coded video sequence.

Figure 3:
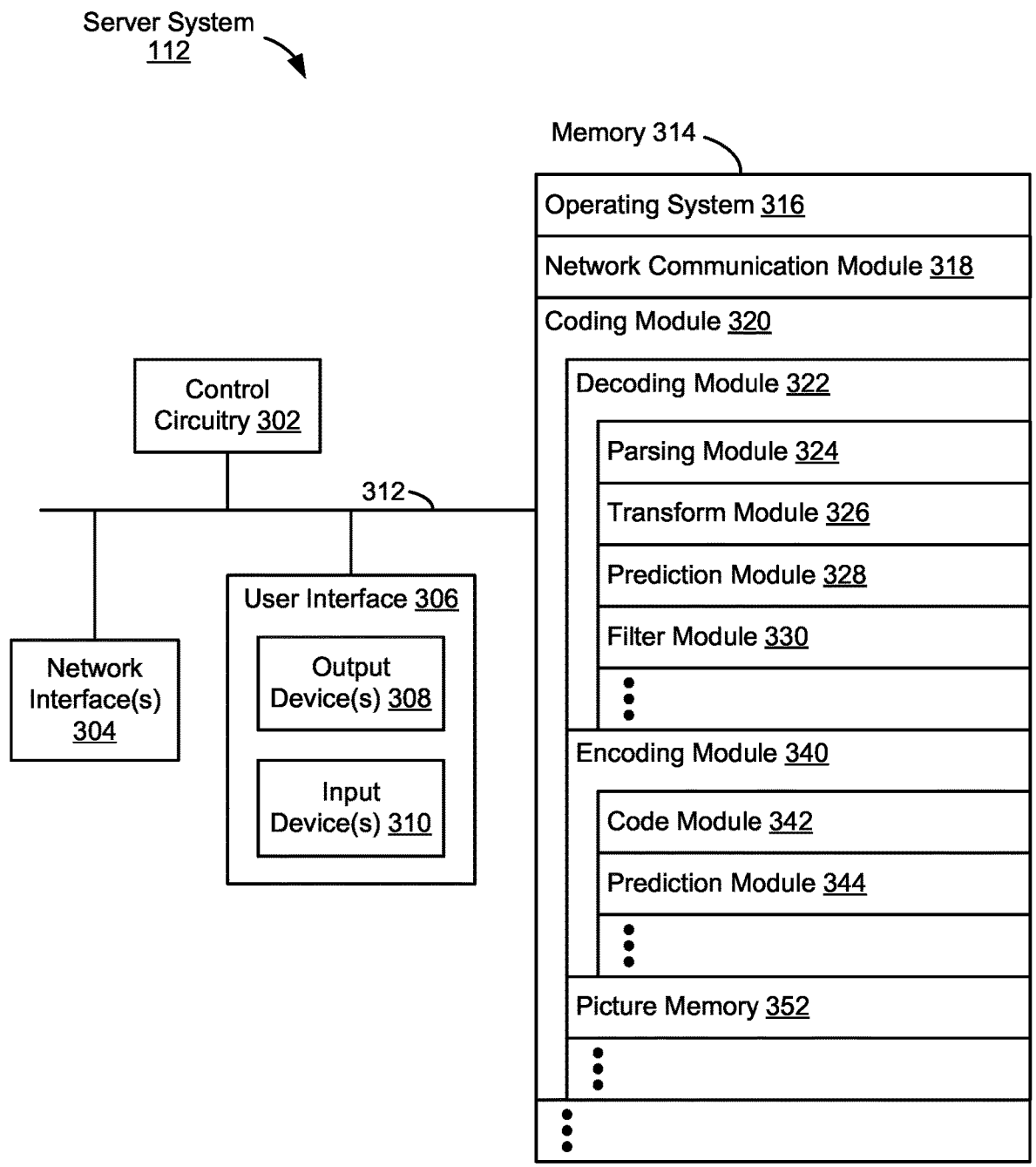
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4A:
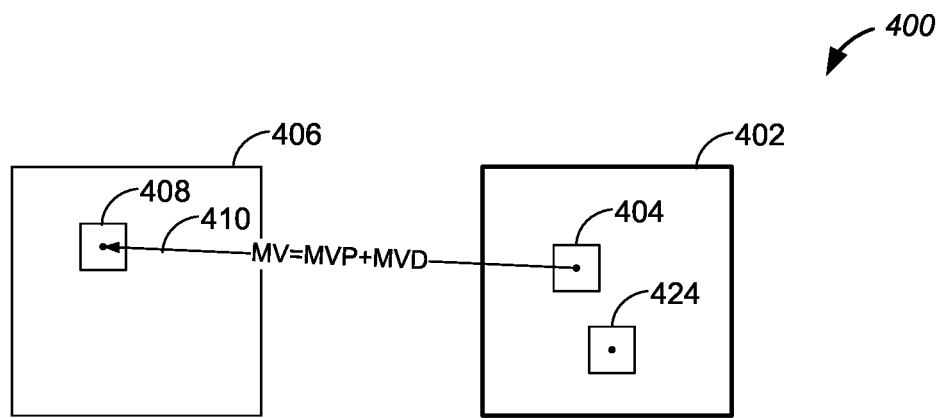
FIG. 4A is a schematic diagram of an inter prediction coding configuration associating a current coding block with a reference block, in accordance with some embodiments.
Figure 4B:
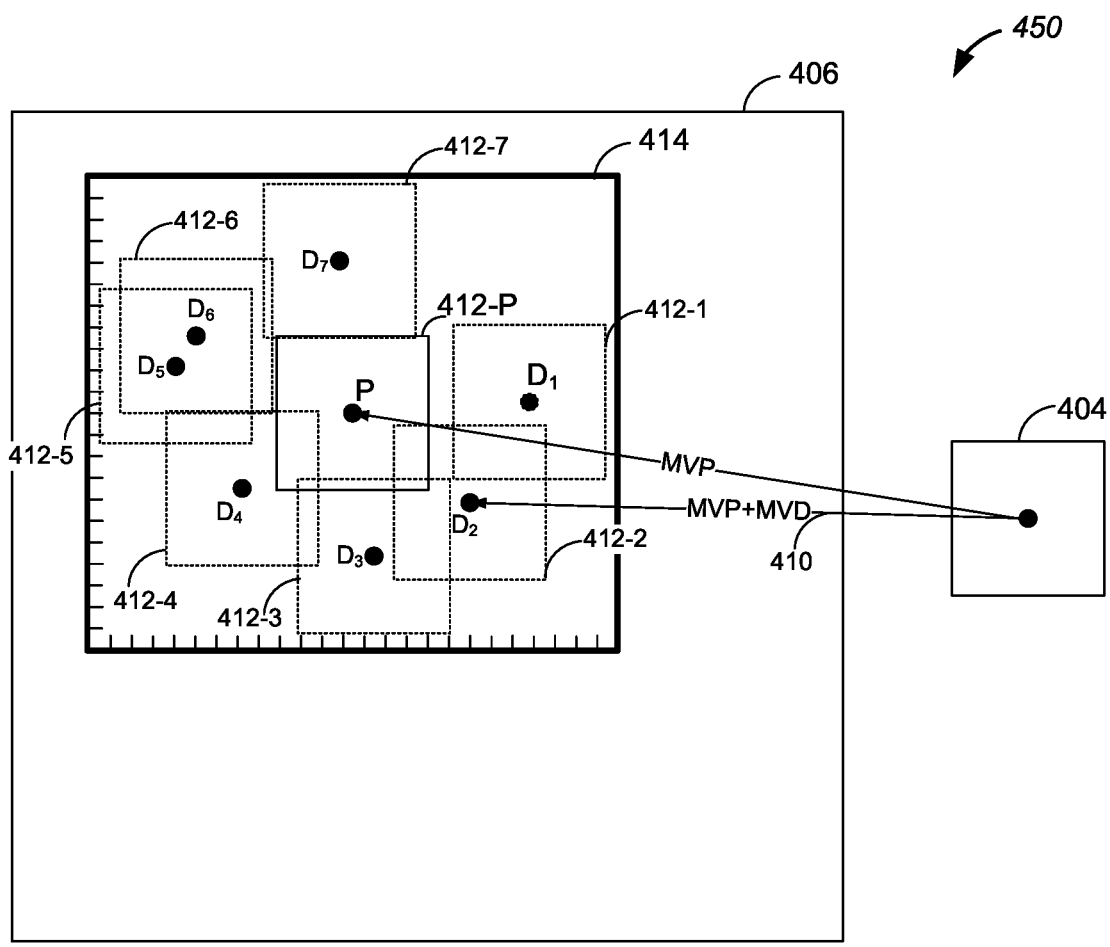
FIG. 4B is a schematic diagram of an inter prediction coding configuration in which an MVD is identified within a region of a reference frame, in accordance with some embodiments.

FIG. 4A is a schematic diagram of an inter prediction coding configuration 400 associating a current coding block 404 with a reference block 408, in accordance with some embodiments, and FIG. 4B is a schematic diagram of an inter prediction coding configuration 450 in which a motion vector different (MVD) is identified within an MVD adaptation region 414 of a reference frame 406, in accordance with some embodiments. A group of pictures (GOP) includes a sequence of image frames. The plurality of image frames includes a current image frame 402 that further includes a current coding block 404. The current coding block 404 is encoded based on one or more reference blocks 408 of one or more reference frames 406 in the GOP. For example, referring to FIG. 4A, the current coding block 404 is encoded based on the reference block 408 in the reference frame 406, and the reference frame 406 optionally precedes or follows the current frame 402. In some embodiments, the reference frame 406 immediately precedes the current frame 402 in the GOP. Alternatively, in some embodiments, the reference frame 406 immediately follows the current frame 402 in the GOP. Alternatively, in some embodiments, the reference frame 406 is separated from the current frame 402 by a number of frames (e.g., 3 frames) in the GOP.

In some embodiments, the current coding block 404 is determined based on the reference block 404 in a translational motion mode in which subblocks or samples of the current coding block 404 have no internal relative displacement with respect to each other. A motion vector 410 of the current coding block 404 is applied to code and predict each subblock or sample of the current coding block 404 based on a respective reference subblock or sample of the reference block 408. Conversely, in some embodiments, the current coding block 404 is determined based on the reference block 404 in a warped motion mode in which subblocks or samples of the current coding block 404 have internal relative displacements with respect to each other. A motion vector 410 of the current coding block 404 is adjusted for each subblock or sample of the current coding block 404, before the motion vector 410 is used to code or predict the subblock or sample based on a respective reference subblock or sample of the reference block 408.

In some embodiments, a motion vector 410 of a current coding block 404 is a combination of a motion vector prediction (MVP) and a MVD. The MVP is fixed, and the MVD is adaptively encoded and encoded for the current coding block 404. Referring to FIG. 4B, in some embodiments, the MVP identifies a center of a prediction reference block 412-P for the current coding block 404. A plurality of candidate reference blocks 412 (e.g., 412-P, 412-1 to 412-7 centered at D1 to D7) are identified in an MVD adaptation region 414 including the prediction reference block 412-P. The MVD adaptation region 414 is defined based on an MVD magnitude range, which is one of a plurality of MVD adjustment parameters of the current coding block 404. An example MVD magnitude range corresponds to 32 pixels. In an example, a center of each of the plurality of candidate reference blocks 412 (e.g., 412-1 to 412-7 centered at D1 to D7) is within a distance of 32 pixels of the center P of the reference block 412-P. Alternatively, in another example, both an x-axis displacement and a y-axis displacement of each candidate reference block 412 are within 32 pixels of the center P of the reference block 412-P. In some embodiments, centers of the plurality of candidate reference blocks (412-R and 412-1 to 412-7) are separated by at least a MVD precision limit, which is another one of the plurality of MVD adjustment parameters of the current coding block 404. An example MVD precision limit corresponds to a quarter of a pixel (e.g., a ¼-pel resolution). For example, any two centers of the plurality of candidate reference blocks 412 (e.g., 412-1 to 412-7) are separated by at least a quarter of a pixel. Alternatively, an x-axis displacement and a y-axis displacement of any two centers of the candidate reference blocks 412 are equal to or greater than a quarter of a pixel. In some embodiments, the MVD precision limit is a finest supported MVD precision. Alternatively, in some embodiments, the MVD precision limit is a coarsest supported MVD precision. Stated another way, in some embodiments, the smallest distance of the centers of the candidate reference blocks 412 has two different settings (e.g., values) in the warp motion mode and in the translational motion mode, so does the size of the MVD adaptation region 414.

In some embodiments, adaptive MVD is applied, independently of the translational motion mode and the warped motion mode, and the same MVD settings are applied to an MVD adaptation parameter of these two motion modes. Conversely, adaptive MVD is applied in the translational motion mode and the warped motion mode, and different MVD settings for the MVD adaptation parameter (e.g., a plurality of MVD precisions in a MVD precision range, MVD precision limits, MVD magnitude range) are used in these two motion modes. The precision range is limited by MVD precision limits, e.g., a finest precision and a coarsest precision. For example, a first MVD precision limit is applied in the warped motion mode, and a second MVD precision limit is applied in the translational motion mode. The second MVD precision limit is distinct from the first MVD precision limit, i.e., has a different value. In some situations, the first MVD precision limit of the warped motion mode is equal to a half of a pixel, which is higher than the second MVD precision limit (e.g., a quarter or one eighth of a pixel) of the translational motion mode. Conversely, in some situations, the first MVD precision limit of the warped motion mode is equal to one eighth of a pixel, which is lower than the second MVD precision limit (e.g., a half of a pixel) of the translational motion mode.

In another example, a first MVD magnitude range is applied in the warped motion mode, and a second MVD magnitude range is applied in the translational motion mode. The second MVD magnitude range is distinct from the first MVD magnitude range. In some situations, the first MVD magnitude range of the warped motion mode is equal to 32 pixels, which is greater than the second MVD magnitude range (e.g., 8 pixels) of the translational motion mode. Conversely, in some situations, the first MVD magnitude range of the warped motion mode is equal to 8 pixels, which is smaller than the second MVD magnitude range (e.g., 32 pixels) of the translational motion mode.

In some embodiments, in accordance with adaptive MVD determination, one of the plurality of candidate references blocks (e.g., 412-2) is identified as a reference block 408 of the current coding block 404, and a MVD is associated with the identified reference block 408 of the current block 404. The motion vector prediction MVP and the MVD of the current coding block 404 are coded in a bitstream by an encoder 106 and sent to a decoder 122. In some embodiments, the warped motion mode and the translation motion mode are associated with different encoding context. In accordance with a determination that the current coding block is coded with the warped motion mode, first context is determined for entropy encoding the current coding block. In accordance with a determination that the current coding block is coded with the translational motion mode, second context is determined for entropy encoding the current coding block. The second context is distinct from the first context. Upon receiving the bitstream, the encoder 122 extracts the MVD of the current coding block 404 based on whether the warped motion mode or the translation motion mode is applied. Specifically, one or more MVD settings of the current coding block 404 are determined based on the motion mode, and the MVD and the reference block of the current coding block 404 are determined based on the one or more MVD settings.

In some embodiments, the current coding block 404 is coded with the warped motion mode, and a first MVD setting is selected to reconstruct the current coding block 404. An alternative coding block 424 of the current image frame 402 is distinct from the current coding block 404. It is determined that the alternative coding block 424 of the current image frame 402 is coded with the translational mode. A second MVD setting is selected for the alternative coding block 424, such that the alternative coding block 424 is reconstructed based at least in part on the second MVD setting. As such, different coding blocks of the current coding block 402 may have different motion modes and different MVD settings.

Figure 5:
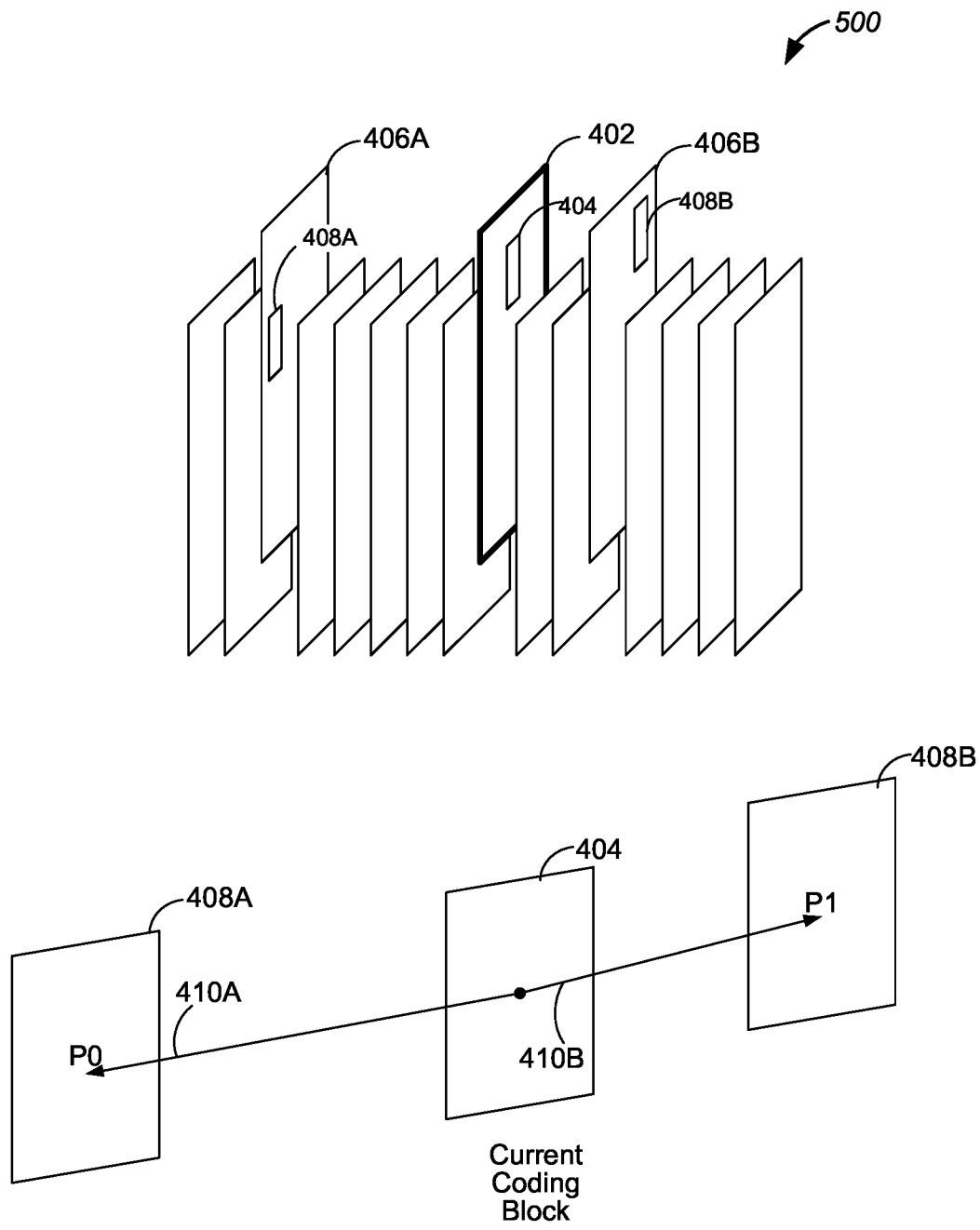
FIG. 5 is a schematic diagram of a bilateral matching configuration associating a current coding block in a GOP with two reference blocks located in the same GOP based on two distinct motion vectors, in accordance with some embodiments.

FIG. 5 is a schematic diagram of a bilateral matching configuration 500 associating a current coding block 404 in a GOP with two reference blocks 408A and 408B located in the same GOP based on two distinct motion vectors 410A and 410B, in accordance with some embodiments. In some embodiments, bilateral matching or template matching is applied to encode the current coding block 404. For example, the current coding block 400 is encoded based on prediction data of two reference blocks 408A and 408B of two reference images 406A and 406B in the GOP. In an example, the current coding block 404 is temporally located between a first reference block 408A and a second reference block 408B. One of the reference blocks 408A and 408B precedes the current coding block 400, and the other one of the reference blocks 408A and 408B follows the current coding block 400. Each reference frame 406A or 406B is immediately next to the current frame 402 or separated from the current frame 402 by a number of frames.

In some embodiments, the current coding block 404 is coded based on the two reference blocks 408A and 408B in a translational motion mode. In some embodiments, the current coding block 404 is coded based on the two reference blocks 408A and 408B in a warped motion mode. A motion vector 410A or 410B of the current coding block 404 is adjusted based on warped motion for each subblock or sample of the current coding block 404, before the motion vector 410A or 410B is used to code or predict the subblock or sample based on a respective reference subblock or sample of the reference block 408A or 408B. Additionally, in some embodiments associated with bilateral matching, the MVD of the motion vector 410A or 410B is determined adaptively, independently of the translational motion mode and the warped motion mode, and the same MVD settings are applied to these two motion modes. Conversely, in some embodiments associated with bilateral matching, the MVD of the motion vector 410A or 410B is determined adaptively in both the translational motion mode and the warped motion mode, and different MVD settings (e.g., a plurality of MVD precisions in a precision range, MVD precision limits, MVD magnitude range) are used in these two motion modes.

Figure 6A:
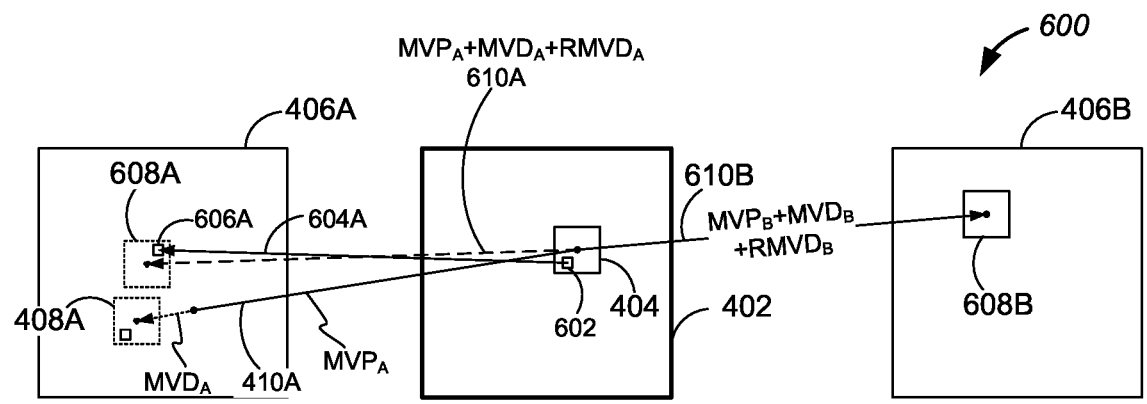
FIG. 6A is a schematic diagram of a bilateral matching configuration in which an MVD of a reference block is refined, in accordance with some embodiments.
Figure 6B:
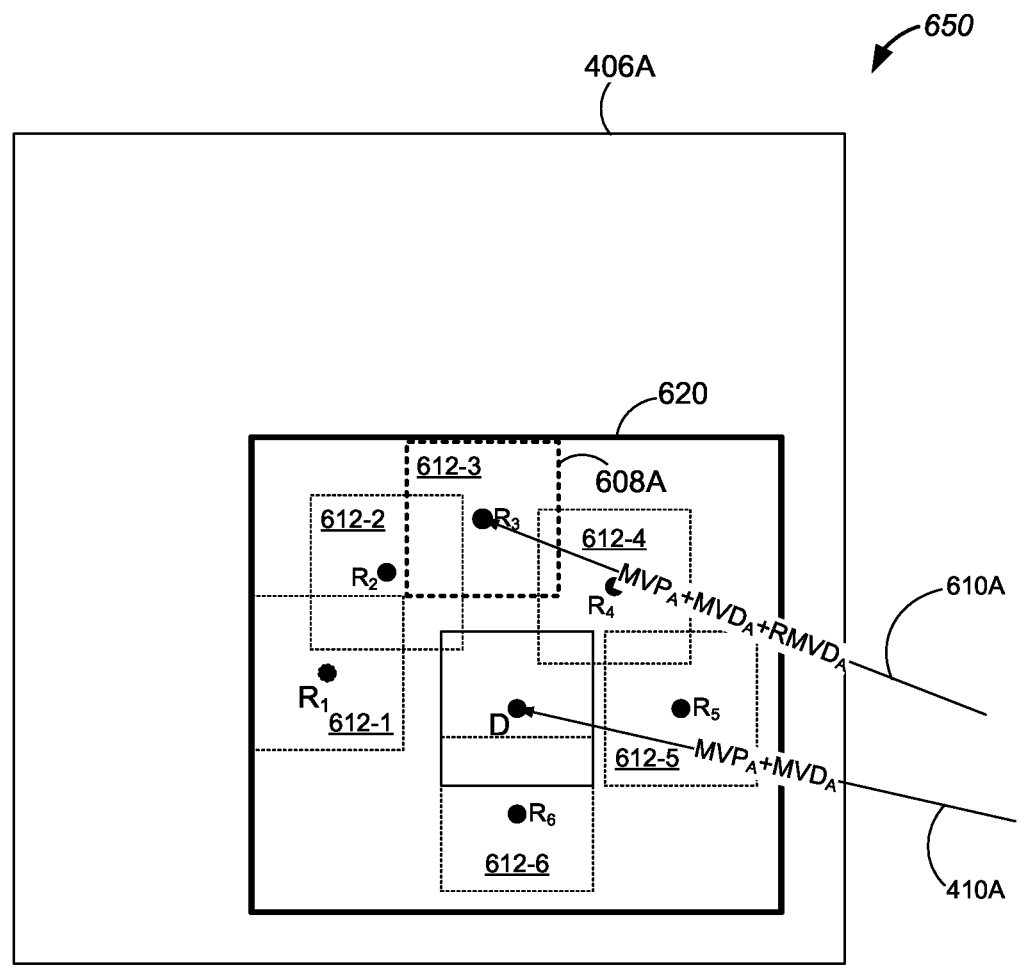
FIG. 6B is a schematic diagram of a bilateral matching configuration in which an MVD of a reference block is refined in an MVD refinement range, in accordance with some embodiments.

FIG. 6A is a schematic diagram of a bilateral matching configuration 600 in which an MVD (e.g., MVDA, MVDB) of a reference block (e.g., 608A, 608B) is refined, in accordance with some embodiments, and FIG. 6B is a schematic diagram of a bilateral matching configuration 650 in which an MVD of a reference block 608A is refined in an MVD refinement range 620, in accordance with some embodiments. The MVD of the motion vector 410A or 410B is determined adaptively in an MVD adaptation region 414 (FIG. 4B) in either one of a warped motion mode and a translational motion mode. In some embodiments, adaptive MVDs of the warped and translational motion modes are obtained based on the same MVD settings (e.g., corresponding to the same candidate reference blocks 412 in the MVD adaptation region 414). Alternatively, in some embodiments, one or more MVD settings is distinct in the warped and translational motion modes (e.g., corresponding to different candidate reference blocks 412 in the MVD adaptation region 414 having different sizes). Corresponding MVD settings are used in the warped or translational motion mode to determine a first MVD (MVDA) of the first motion vector 610A.

Additionally, the first MVD (MVDA) that is adaptively identified in the MVD adaptation region 414 is further refined based on a cost criterion of a difference of the first and second reference blocks 408A and 408B to generate a first refined MVD (RMVDA) corresponding to a refined first motion vector 610A of a refined first reference block 608A. The first MVD (MVDA) of the first motion vector 610A is transmitted from the encoder 106 to the decoder 122. Conversely, the first refined MVD (RMVDA) of the refined motion vector 610A is not transmitted with the MVD, and is determined separately in both the encoder 106 and decoder 122. The first motion vector 610A is determined based on a first motion vector prediction MVPA, the first MVD (MVDA), and the first refined MVD (RMVDA). Further, in some embodiments, a second refined MVD (RMVDB) is determined for refining a second MVD (MVDB) of the second reference block 408B. The second refined MVD (RMVDB) corresponds to a refined second motion vector 610B of a refined second reference block 608B. In some embodiments, the first refined MVD (RMVDA) is mirrored to generate an intermediate MVD, and the intermediate MVD is scaled to generate the second refined MVD (RMVDB) based on a ratio between two distances of the first and second reference blocks 608A and 608B from the current coding block 404, i.e., based on a ratio of a first distance between two blocks 404 and 608A and a second distance between two blocks 404 and 608B.

In some embodiments, only the first motion vector 610A of the first reference block 608A is refined with a first refined MVD (RMVDA) on a block level. In the warped motion mode, the first motion vector 610A is adjusted for each subblock or sample of the current coding block 404, before the motion vector 610A is used to code or predict the subblock or sample based on a respective reference subblock or sample of the reference block 608A. Specifically, in some embodiments, in accordance with a determination that the current coding block 404 is coded with the warped motion mode, the first motion vector 610A of the current coding block 404 is applied to determine a subblock motion vector (e.g., a vector 604A) for each of a set of subblocks (e.g., a first subblock 602) of the current coding block 404. Further, in some embodiments, the current coding block 404 includes the first subblock 602. The first subblock has two reference blocks including a first reference subblock 606A in a first reference frame 406A and a second reference subblock in a second reference frame 406B. Based on a cost criterion of a difference of the first and second reference subblocks, a subblock MVD associated with the first reference subblock 606A is refined to determine a refined subblock MVD, e.g., on a subblock level. The subblock motion vector 604A is refined for the first subblock 602 based on the subblock refined MVD associated with the first reference subblock 606A.

It is noted that the first motion vector 610A is determined based on the first motion vector prediction MVPA, the first MVD (MVDA), and the first refined MVD (RMVDA). The first MVD (MVDA) of the first motion vector 610A is determined based on one or more MVD settings (e.g., MVD precision limits, MVD magnitude range), and transmitted jointly with the motion vector prediction MVPA. More details on adaptive MVD determination are explained above with reference to FIG. 4B. Additionally, the first refined MVD (RMVDA) is determined based on a cost criterion of a difference of the first and second reference blocks 608A and 608B. The difference of the first and second reference blocks 608A and 608B includes one of: a sum of absolute difference (SAD), a sum of squared error (SAE), a sum of absolute transform difference (SATD), and a sum of mean removed SAD.

In some embodiments, MVD refinement is implemented at both the encoder 106 and the decoder 122. The first refined MVD (RMVDA) is not transmitted with the first MVD (MVDA), and is determined separately during MVD refinement in both the encoder 106 and decoder 122. Referring to FIG. 6B, during MVD refinement, a plurality of refinement options 612 centered at R1-R6 is identified in the MVD refinement range 620 for the first reference block 608A. It is determined that a difference of the first and second reference blocks 608A and 608B corresponding to one of the plurality of refinement options (e.g., the refinement option 612-3 centered at R3) satisfies the cost criterion. For example, in accordance with the cost criterion, the refinement option 612-3 provides the smallest difference of the first and second reference blocks 608A and 608B among the plurality of refinement options 612-1 to 612-6. The one of the plurality of refinement options, which satisfies the cost criterion, is identified to provide the first refined MVD (RMVDA). Further, in some embodiments, during MVD refinement, a plurality of differences of the first and second reference blocks 608A and 608B is determined for the plurality of refinement options 612. Each difference corresponds to a respective one of the plurality of refinement options 612 for the first reference block 610A. The plurality of differences are compared to determine whether each difference satisfies the cost criterion.

In some embodiments, a subset of the plurality of refinement options (e.g., 612-1 and 612-2) is preferred. A subset of differences is determined based on the subset of preferred refinement options. Before comparing the plurality of the differences, the encoder 106 or decoder 122 modifies the subset of differences with a difference factor that is less than 1, e.g., by scaling the subset of differences by the difference factor. Conversely, in some embodiments, a subset of the plurality of refinement options (e.g., 612-3 and 612-4) is less preferred than remaining refinement options. Before comparing the plurality of the differences, the encoder 106 or decoder 122 modifies the subset of differences with a difference factor that is greater than 1, e.g., by scaling the subset of differences by the difference factor.

Figure 7:
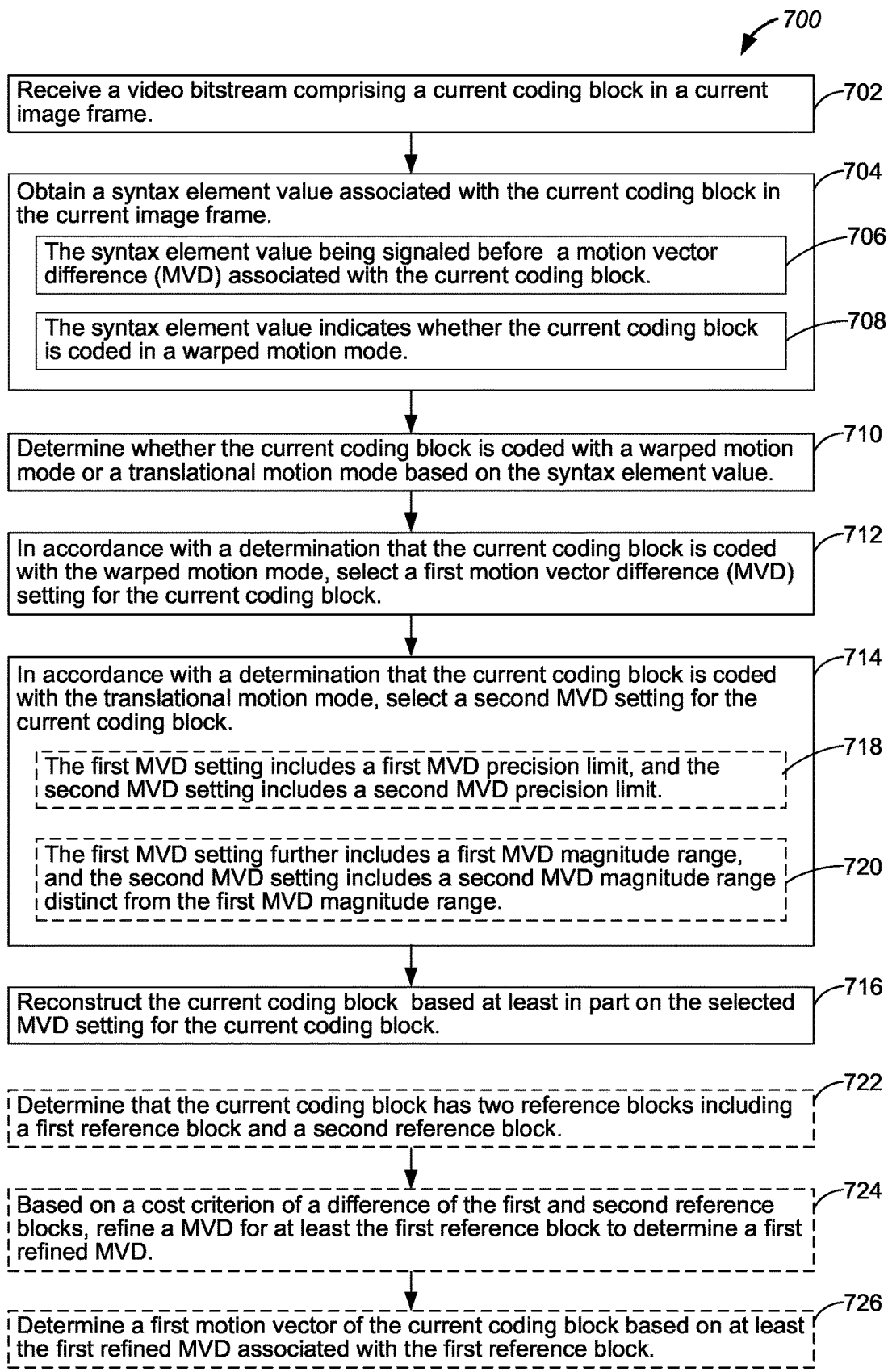
FIG. 7 is a flow diagram illustrating a method of coding video, in accordance with some embodiments.

FIG. 7 is a flow diagram illustrating a method 700 of coding video (e.g., decoding video data), in accordance with some embodiments. The method 700 may be performed at a computing system (e.g., the server system 112, the source device 102, or the electronic device 120) having control circuitry and memory storing instructions for execution by the control circuitry. In some embodiments, the method 700 is performed by executing instructions stored in the memory (e.g., the coding module 320 of the memory 314) of the computing system. In some embodiments, a flag is applied to indicate whether a current coding block is coded in a warped motion mode or not.

A video bitstream includes (702) a current coding block 404 in a current image frame 402. The decoder 122 obtains (704) a syntax element value associated with the current coding block 404 in the current image frame 402. The syntax element value is signaled (706) before a motion vector difference (MVD) associated with the current coding block. The syntax element value is signaled to indicate (708) whether the current coding block 404 is coded in a warped motion mode. before MVD, and MVD signaling of the current coding block 404 depends on whether the current coding block 404 is coded in a warped motion mode or not (e.g., in the warped motion mode or a translational motion mode). For example, an encoder 106 (FIG. 2A) determines whether the current coding block 404 is coded in the warped motion mode or the translational motion mode, and generates the flag. An decoder 122 receives the flag and determines (710) whether the current coding block 404 is coded in the warped motion mode or the translational motion mode based on the flag. An adaptive MVD is applied to the current coding block 404, and two different sets of MVD settings are applied for coding warped motion associated with the warped motion mode and translational motion associated with a translational motion mode. In accordance with a determination that the current coding block 404 is coded (712) with the warped motion mode, a first MVD setting is selected to encode and decode the current coding block 404. Alternatively, in accordance with a determination that the current coding block 404 is coded (714) with the translational motion mode, a second MVD setting is selected to encode and decode the current coding block 404. The second MVD setting is distinct from the second MVD setting. Stated another way, the first and second MVD settings provide different values for the same set of MVD adjustment parameters (e.g., including a single parameter or multiple parameters) applied to determine the MVD in the warped or translational mode. The decoder 122 reconstructs (716) the current coding block 404 based at least in part on the selected MVD setting for the current coding block 404.

In some embodiments, the two sets of MVD settings differ in MVD precision limit. Further, in some embodiments, adaptive MVD precision is applied, and a first MVD precision limit (e.g., a first finest supported MVD precision) for the warped motion mode is different from (718) a second MVD precision limit (e.g., a second finest supported MVD precision) for the translational motion mode. In some situations, the first MVD precision limit of the warped motion mode is coarser than the second MVD precision limit of the translational motion mode. For example, the finest MVD precision for warped motion is one half of a pixel (also called picture element (pel)) corresponding to a half-pel motion vector accuracy. The finest MVD precision for translational motion is one quarter or eighth of a pixel corresponding to a quarter-pel or ⅛-pel motion vector accuracy. Conversely, in some situations, the first MVD precision limit of the warped motion mode is finer than the second MVD precision limit of the translational motion mode. For example, the finest MVD precision for warped motion is one quarter or eighth of a pixel, and the finest MVD precision for translational motion is one half of a pixel.

Alternatively, in some embodiments, the two sets of MVD precisions of the warped and translational motion modes differ in an MVD magnitude range. In some embodiments, an adaptive MVD precision is applied, and a first MVD magnitude range (e.g., a first maximum supported MVD magnitude) for the warped motion mode is different from (720) a second MVD magnitude range (e.g., a second maximum supported MVD magnitude) of the translational motion mode. In some situations, the first MVD magnitude range of the warped motion mode is less than the second MVD magnitude range of the translational motion mode. For example, the first maximum supported MVD magnitude for warped motion is 8 pixels, and the second maximum supported MVD magnitude for translational motion is 32 pel or more. Conversely, in some situations, the first MVD magnitude range of the warped motion mode is greater than the second MVD magnitude range of the translational motion mode. For example, the first maximum supported MVD magnitude for warped motion is 32 pixels, and the second maximum supported MVD magnitude for translational motion is 8 pixels.

In some embodiments, the MVD for warped motion associated with the warped motion mode is refined using bilateral matching or template matching. This MVD refinement is conducted at both the encoder 106 and decoder 122, and a corresponding MVD refinement result caused by the refinement of MVD is not signaled in the bitstream communicated between the encoder 106 and decoder 122. Further, in some embodiments, warped motion and translational motion are coded with the same set of MVD settings (e.g., MVD precisions and magnitudes). In some embodiments, warped motion and translational motion are coded with different MVD settings.

In some embodiments, the current coding block 404 is coded in the warped motion mode and adaptive MVD resolution is applied. For each MVD in a MVD magnitude range including a motion vector of the current coding block 404 (e.g., an allowed/given search area surrounding the motion vector), at least one of the prediction blocks P0 or P1 is generated with a respective motion vector 410 that is equal to a sum of MV (e.g., a combination of a MVP and signaled MVD) and a refined MVD. A difference between prediction blocks P0 and P1 (i.e., 608A and 608B in FIG. 6A) is determined, and applied as a cost to further determine whether a cost criterion is satisfied. In an example, the refined MVD (e.g., RMVDA in FIGS. 6A and 6B) corresponding to a minimum cost value satisfies the cost criterion and is used to determine the motion vector of the current coding block 404. In some embodiments, a first refined MVD (RMVDA) is determined for a first prediction block 608A of a first reference frame 406A, and further applied to determine a second refined MVD (RMVDB) of a second reference frame 406B. In an example, the second refined MVD (RMVDB) is mirrored from the first refined MVD (RMVDA) based on distances between the first and second reference frames 406 and the current frame 402. In some embodiments, a distance between the reference frame 406A or 406B and the current frame 402 is determined based on one of a SAD (sum of absolute difference), SSE (sum of squared error), and SATD (sum of absolute transform difference).

In some embodiments, a distortion cost (e.g., the difference between prediction blocks P0 and P1) of one or more certain positions on the reference frames 406A and 406B (FIG. 6B) is modified by a factor, thereby adjusting a preference level of using a prediction block (e.g., block 612-1 in FIG. 6B) associated with each of the positions as a reference. When the factor is larger than 1, the prediction block associated with a corresponding position is less preferred. When the factor is smaller than 1, the prediction block associated with a corresponding position is more preferred. For example, the distortion cost of a start position is scaled by a factor less than 1, making a prediction block associated with this start position more preferred than other predication blocks when these prediction blocks are used as a reference of the current coding block 404. As such, adjustment of the factor reduces computational complexity during the course of refining the MVD in bilateral matching.

In some embodiments, a block-level motion vector of the current coding block 404 is refined based on the difference between prediction blocks P0 and P1 and the cost criterion. Subblocks 602 of the current coding block 404 is coded in the warped motion mode using one or more MVD settings (e.g., MVD precision limit, MVD magnitude range). In an example, after a refined MVD (e.g., RMVDA) is determined using a refinement process, warp motion is adjusted or projected accordingly.

Additionally, in some embodiments, two different sets of motion vector precisions are applied for warped motion associated with a warped motion mode and translational motion associated with a translational motion mode, respectively. In some embodiments, the finest supported MV precision for warped motion is different from (e.g., coarser than) that for translational motion. For example, the finest MV precision for warped motion is 1/16 pel, and the finest MV precision for translational motion is quarter pel or 1/8 pel. Alternatively, in some embodiments, the coarsest supported MV precision for warped motion is different from (e.g., less than) that for translational motion. For example, the coarsest supported MV precision for warped motion is 1 pel whereas the finest MV precision for translational motion is 4 pel or more.

In some embodiments, a flag indicates whether the current coding block 404 is coded with a warped motion mode or not, and is used to derive context for entropy coding the MVD of the current coding block 404.

Although FIG. 7 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method for processing video data. The method 700 includes receiving (702) a video bitstream including a current coding block (e.g., block 404 in FIGS. 4A-6B) in a current image frame 402 and obtaining (704) a syntax element value associated with the current coding block in the current image frame. The syntax element value is signaled (706) before a motion vector difference (MVD) associated with the current coding block. The syntax element value indicates (708) whether the current coding block is coded in a warped motion mode. The method 700 further includes determining (710) whether the current coding block is coded with a warped motion mode or a translational motion mode based on the syntax element value. The method further includes in accordance with a determination that the current coding block is coded with the warped motion mode, selecting (712) a first motion vector difference (MVD) setting for the current coding block. The method 700 further includes in accordance with a determination that the current coding block is coded with the translational motion mode, selecting (714) a second MVD setting for the current coding block, the second MVD setting distinct from the second MVD setting. The method 700 further includes (716) reconstructing the current coding block based at least in part on the selected MVD setting for the current coding block.

(A2) In some embodiments of A1, the first MVD setting includes (718) a first MVD precision limit, and the second MVD setting includes a second MVD precision limit. The first MVD precision limit is lower than the second MVD precision limit.

(A3) Alternatively, in some embodiments of A1, the first MVD setting includes a first MVD precision limit, and the second MVD setting includes a second MVD precision limit. The first MVD precision limit is higher than the second MVD precision limit.

(A4) In some embodiments of A1-A3, the first MVD setting further includes (720) a first MVD magnitude range, and the second MVD setting includes a second MVD magnitude range distinct from the first MVD magnitude range.

(A5) In some embodiments of A4, the first MVD magnitude range is greater than the second MVD magnitude range.

(A6) Alternatively, in some embodiments of A4, wherein the first MVD magnitude range is smaller than the second MVD magnitude range.

(A7) In some embodiments of A1-A6, the method further includes determining (722) that the current coding block has two reference blocks including a first reference block and a second reference block and determining a first MVD for the first reference block based on one of the first MVD setting and the second MVD setting. The method further includes based on a cost criterion of a difference of the first and second reference blocks, refining (724) the first MVD for at least the first reference block to determine a first refined MVD. The method further includes determining (726) a first motion vector of the current coding block based on at least the first refined MVD associated with the first reference block.

(A8) In some embodiments of A7, the method further includes determining a second refined MVD for refining a MVD of the second reference block by mirroring the first refined MVD to generate an intermediate MVD and scaling the intermediate MVD to generate the second refined MVD based on a ratio between two distances of the first and second reference blocks from the current coding block.

(A9) In some embodiments of A7 or A8, the difference of the first and second reference blocks includes one of: a sum of absolute difference (SAD), a sum of squared error (SAE), a sum of absolute transform difference (SATD), and a sum of mean removed SAD.

(A10) In some embodiments of A7-A9, refining the MVD for at least the first reference block further includes identifying a plurality of refinement options for the first reference block, determining that a difference of the first and second reference blocks corresponding to one of the plurality of refinement options satisfies the cost criterion, and identifying the one of the plurality of refinement options as the first refined MVD.

(A11) In some embodiments of A10, refining the MVD for at least the first reference block further includes determining a plurality of differences of the first and second reference blocks and comparing the plurality of differences to determine whether each difference satisfies the cost criterion. Each difference corresponds to a respective one of the plurality of refinement options for the first reference block.

(A12) In some embodiments of A11, determining the plurality of differences further includes determining a subset of differences based on a subset of refinement options and before comparing the plurality of the differences, modifying the subset of differences with a difference factor that is less than 1.

(A13) In some embodiments of A11, determining the plurality of differences further includes determining a subset of differences based on a subset of refinement options; and before comparing the plurality of the differences, modifying the subset of differences with a difference factor that is greater than 1.

(A14) In some embodiments of A7-A13, the method further includes in accordance with a determination that the current coding block is coded with the warped motion mode, applying the first motion vector of the current coding block to determine a subblock motion vector for each of a set of subblocks of the current coding blocks.

(A15) In some embodiments of A14, the current coding block includes a first subblock. The method further includes determining that the first subblock has two reference blocks including a first reference subblock and a second reference subblock; based on a cost criterion of a difference of the first and second reference subblocks, refining a subblock MVD of the first reference subblock to determine a refined subblock MVD; and updating the subblock motion vector for the first subblock based on the refined subblock MVD associated with the first reference subblock.

(A16) In some embodiments of A1-A15, each of the first and second MVD settings corresponds to a finest supported MVD precision for the current coding block.

(A17) In some embodiments of A1-A15, each of the first and second MVD settings corresponds to a coarsest supported MVD precision for the current coding block.

(A18) In some embodiments of A1-A17, the method further includes in accordance with a determination that the current coding block is coded with the warped motion mode, determining first context for entropy encoding the current coding block. The method further includes in accordance with a determination that the current coding block is coded with the translational motion mode, determining second context for entropy encoding the current coding block, the second context distinct from the first context.

(A19) In some embodiments of A1-A18, the current coding block is coded with the warped motion mode, and the first MVD setting is selected to reconstruct the current coding block. The method 700 includes determining that an alternative coding block of the current image frame is coded with the translational mode, selecting the second MVD setting for the alternative coding block, and reconstructing the alternative coding block based at least in part on the second MVD setting for the alternative coding block. The alternative coding block is distinct from the current coding block.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A18 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A19 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments.

However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
  receiving a video bitstream comprising a current coding block in a current image frame;
  obtaining a syntax element value associated with the current coding block in the current image frame, the syntax element value being signaled before a motion vector difference (MVD) associated with the current coding block, the syntax element value indicating whether the current coding block is coded in a warped motion mode;
  determining whether the current coding block is coded with the warped motion mode or a translational motion mode based on the syntax element value;
  in accordance with a determination that the current coding block is coded with the warped motion mode, selecting a first motion vector difference (MVD) setting for the current coding block;
  in accordance with a determination that the current coding block is coded with the translational motion mode, selecting a second MVD setting for the current coding block, the second MVD setting distinct from the first MVD setting; and
  reconstructing the current coding block based at least in part on the selected MVD setting for the current coding block.

2. The method of claim 1, wherein the first MVD setting includes a first MVD precision limit, and the second MVD setting includes a second MVD precision limit, and wherein the first MVD precision limit is lower than the second MVD precision limit.

3. The method of claim 1, wherein the first MVD setting includes a first MVD precision limit, and the second MVD setting includes a second MVD precision limit, and wherein the first MVD precision limit is higher than the second MVD precision limit.

4. The method of claim 1, wherein the first MVD setting further includes a first MVD magnitude range, and the second MVD setting includes a second MVD magnitude range distinct from the first MVD magnitude range.

5. The method of claim 4, wherein the first MVD magnitude range is greater than the second MVD magnitude range.

6. The method of claim 1, wherein the current coding block is coded with the warped motion mode, and the first MVD setting is selected to reconstruct the current coding block, further comprising:
  determining that an alternative coding block of the current image frame is coded with the translational mode, the alternative coding block distinct from the current coding block;
  selecting the second MVD setting for the alternative coding block; and
  reconstructing the alternative coding block based at least in part on the second MVD setting for the alternative coding block.

7. The method of claim 1, further comprising:
  determining that the current coding block has two reference blocks including a first reference block and a second reference block;
  determining a first MVD for the first reference block based on one of the first MVD setting and the second MVD setting;
  based on a cost criterion of a difference of the first and second reference blocks, refining the first MVD for at least the first reference block to determine a first refined MVD; and
  determining a first motion vector of the current coding block based on at least the first refined MVD associated with the first reference block.

8. The method of claim 7, further comprising:
  determining a second refined MVD for refining a MVD of the second reference block, including:
    mirroring the first refined MVD to generate an intermediate MVD; and
    scaling the intermediate MVD to generate the second refined MVD based on a ratio between two distances of the first and second reference blocks from the current coding block.

9. The method of claim 7, wherein the difference of the first and second reference blocks includes one of: a sum of absolute difference (SAD), a sum of squared error (SAE), a sum of absolute transform difference (SATD), and a sum of mean removed SAD.

10. The method of claim 7, refining the MVD for at least the first reference block further comprising:
  identifying a plurality of refinement options for the first reference block;
  determining that a difference of the first and second reference blocks corresponding to one of the plurality of refinement options satisfies the cost criterion;
  identifying the one of the plurality of refinement options as the first refined MVD.

11. The method of claim 10, refining the MVD for at least the first reference block further comprising:
  determining a plurality of differences of the first and second reference blocks, each difference corresponding to a respective one of the plurality of refinement options for the first reference block; and
  comparing the plurality of differences to determine whether each difference satisfies the cost criterion.

12. The method of claim 11, determining the plurality of differences further comprising:
  determining a subset of differences based on a subset of refinement options; and
  before comparing the plurality of the differences, modifying the subset of differences with a difference factor that is less than 1.

13. The method of claim 11, determining the plurality of differences further comprising:
  determining a subset of differences based on a subset of refinement options; and
  before comparing the plurality of the differences, modifying the subset of differences with a difference factor that is greater than 1.

14. A computing system, comprising:
  control circuitry; and
  memory storing one or more programs configured to be executed by the control circuitry, the one or more programs further comprising instructions for:
    receiving a video bitstream comprising a current coding block in a current image frame;
    obtaining a syntax element value associated with the current coding block in the current image frame, the syntax element value being signaled before a motion vector difference (MVD) associated with the current coding block, the syntax element value indicating whether the current coding block is coded in a warped motion mode;

determining whether the current coding block is coded with the warped motion mode or a translational motion mode based on the syntax element value;

in accordance with a determination that the current coding block is coded with the warped motion mode, selecting a first motion vector difference (MVD) setting for the current coding block;

in accordance with a determination that the current coding block is coded with the translational motion mode, selecting a second MVD setting for the current coding block, the second MVD setting distinct from the first MVD setting; and reconstructing the current coding block based at least in part on the selected MVD setting for the current coding block.

15. The computing system of claim 14, wherein each of the first and second MVD settings corresponds to a finest supported MVD precision for the current coding block.

16. The computing system of claim 14, wherein each of the first and second MVD settings corresponds to a coarsest supported MVD precision for the current coding block.

17. The computing system of claim 14, the one or more programs further comprising instructions for:

in accordance with a determination that the current coding block is coded with the warped motion mode, determining first context for entropy encoding the current coding block; and in accordance with a determination that the current coding block is coded with the translational motion mode, determining second context for entropy encoding the current coding block, the second context distinct from the first context.

18. A non-transitory computer-readable storage medium storing one or more programs for execution by control circuitry of a computing system, the one or more programs comprising instructions for:

receiving a video bitstream comprising a current coding block in a current image frame;

obtaining a syntax element value associated with the current coding block in the current image frame, the syntax element value being signaled before a motion vector difference (MVD) associated with the current coding block, the syntax element value indicating whether the current coding block is coded in a warped motion mode;

determining whether the current coding block is coded with the warped motion mode or a translational motion mode based on the syntax element value;

in accordance with a determination that the current coding block is coded with the warped motion mode, selecting a first motion vector difference (MVD) setting for the current coding block;

in accordance with a determination that the current coding block is coded with the translational motion mode, selecting a second MVD setting for the current coding block, the second MVD setting distinct from the first MVD setting; and reconstructing the current coding block based at least in part on the selected MVD setting for the current coding block.

19. The non-transitory computer-readable storage medium of claim 18, the one or more programs further comprising instructions for:

determining that the current coding block has two reference blocks including a first reference block and a second reference block;

determining a first MVD for the first reference block based on one of the first MVD setting and the second MVD setting;

based on a cost criterion of a difference of the first and second reference blocks, refining the first MVD for at least the first reference block to determine a first refined MVD;

determining a first motion vector of the current coding block based on at least the first refined MVD associated with the first reference block; and in accordance with a determination that the current coding block is coded with the warped motion mode, applying the first motion vector of the current coding block to determine a subblock motion vector for each of a set of subblocks of the current coding block.

20. The non-transitory computer-readable storage medium of claim 19, wherein the current coding block includes a first subblock, the one or more programs further comprising instructions for:

determining that the first subblock has two reference blocks including a first reference subblock and a second reference subblock;

based on a cost criterion of a difference of the first and second reference subblocks, refining a subblock MVD of the first reference subblock to determine a refined subblock MVD; and updating the subblock motion vector for the first subblock based on the refined subblock MVD associated with the first reference subblock.

* * * * *